United States Patent
Pignataro et al.

(10) Patent No.: US 10,404,548 B2
(45) Date of Patent: Sep. 3, 2019

(54) CONTROL OF NETWORK NODES IN COMPUTER NETWORK SYSTEMS

(71) Applicant: Cisco Technology, Inc., San Jose, CA (US)

(72) Inventors: Carlos M. Pignataro, Raleigh, NC (US); Ludwig Alexander Clemm, Los Gatos, CA (US); Yegnanarayanan Chandramouli, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 207 days.

(21) Appl. No.: 15/250,499

(22) Filed: Aug. 29, 2016

(65) Prior Publication Data
US 2018/0062940 A1    Mar. 1, 2018

(51) Int. Cl.
*H04L 12/24* (2006.01)
*H04L 12/26* (2006.01)

(52) U.S. Cl.
CPC .......... *H04L 41/26* (2013.01); *H04L 41/5009* (2013.01); *H04L 43/0876* (2013.01); *H04L 43/10* (2013.01); *H04L 43/12* (2013.01); *H04L 43/50* (2013.01)
(Continued)

(58) Field of Classification Search
CPC .......... H04L 41/26; H04L 43/00; H04L 43/12; H04L 43/0876
See application file for complete search history.

(56) References Cited

U.S. PATENT DOCUMENTS 7,496,655 B2 * 2/2009 Gopalan ............. H04L 41/5009
370/395.43
7,848,337 B1 * 12/2010 Weng ................. H04L 12/4679
370/389

(Continued)

FOREIGN PATENT DOCUMENTS

CN     101026504 A  *  8/2007  ......... H04L 54/0852
GB      2542828 A   *  4/2017  ......... H04L 43/0864

(Continued)

OTHER PUBLICATIONS

Aversa, et al., "Design of an Agent 1-14 Based Monitoring Framework for Federated Clouds", 2016 30th International Conference on Advanced Information Networking and Applications Workshops (WAINA), IEEE, Mar. 23, 2016 (Mar. 23, 2016), pp. 115-120, XP032902404, 6 pages.

(Continued)

*Primary Examiner* — Kostas J Katsikis
(74) *Attorney, Agent, or Firm* — Johnson, Marcou & Isaacs, LLC

(57) ABSTRACT

Installing on a node of a computer network, an agent of a network system. The installed agent receives a network task via the network. The network task involves a second node of the network. The receiving agent generates a probe implementing the task and targeted to the second node. Either the receiving agent or the generated probe generates a command for the second node. The command is related to the probe and can be in the form of a data link layer protocol data unit for network operations, administration, and maintenance (OAM). The agent or node that generates the command communicates the command to the second node. The second node executes the communicated command. The second node communicates an acknowledgment of the executed command to the first node.

17 Claims, 4 Drawing Sheets

(56) References Cited

U.S. PATENT DOCUMENTS

| | | | | |
|---|---|---|---|---|
| 8,145,789 | B1* | 3/2012 | Stamler | H04L 41/0672 709/244 |
| 8,451,745 | B2* | 5/2013 | Weng | H04L 12/4679 370/252 |
| 9,094,299 | B1* | 7/2015 | Rao D.S. | H04L 41/0813 |
| 9,787,559 | B1* | 10/2017 | Schroeder | H04L 43/067 |
| 2003/0208523 | A1* | 11/2003 | Gopalan | H04L 41/5009 709/201 |
| 2005/0099949 | A1* | 5/2005 | Mohan | H04L 47/10 370/236.2 |
| 2006/0013142 | A1* | 1/2006 | Hongal | H04L 12/462 370/248 |
| 2006/0114911 | A1* | 6/2006 | Nguyen | H04L 43/12 370/395.4 |
| 2009/0161566 | A1* | 6/2009 | Sridhar | H04L 12/2856 370/252 |
| 2009/0213746 | A1 | 8/2009 | Ariyoshi et al. | |
| 2009/0232003 | A1* | 9/2009 | Vasseur | H04L 12/4633 370/236.2 |
| 2011/0063992 | A1* | 3/2011 | Weng | H04L 12/4679 370/252 |
| 2011/0299406 | A1* | 12/2011 | Vobbilisetty | H04L 43/0811 370/248 |
| 2012/0275781 | A1* | 11/2012 | McDonald | H04J 14/0283 398/25 |
| 2012/0300639 | A1* | 11/2012 | Janakiraman | H04L 41/12 370/241 |
| 2013/0034355 | A1* | 2/2013 | Zhang | H04Q 11/0067 398/67 |
| 2013/0223218 | A1* | 8/2013 | Vasseur | H04L 45/34 370/232 |
| 2013/0329565 | A1* | 12/2013 | Holness | H04L 43/0811 370/241.1 |
| 2014/0016479 | A1* | 1/2014 | Coomber | H04L 12/413 370/241.1 |
| 2014/0022928 | A1 | 1/2014 | Zingale et al. | |
| 2014/0029441 | A1* | 1/2014 | Nydell | H04L 43/0864 370/241.1 |
| 2014/0029442 | A1* | 1/2014 | Wallman | H04L 69/22 370/241.1 |
| 2014/0043992 | A1* | 2/2014 | Le Pallec | H04L 43/10 370/252 |
| 2014/0211636 | A1* | 7/2014 | Robitaille | H04L 43/0829 370/241.1 |
| 2014/0219114 | A1 | 8/2014 | Vasseur et al. | |
| 2015/0195192 | A1* | 7/2015 | Vasseur | G06F 11/2007 714/47.3 |
| 2016/0048403 | A1* | 2/2016 | Bugenhagen | G06F 9/45558 718/1 |
| 2016/0197799 | A1 | 7/2016 | Clemm et al. | |
| 2016/0308709 | A1* | 10/2016 | Fernandez-Palacios Gimenez | H04L 41/0618 |
| 2017/0078015 | A1* | 3/2017 | Ratterree | H04B 10/03 |
| 2017/0097842 | A1* | 4/2017 | Bugenhagen | G06F 9/45558 |
| 2017/0195209 | A1* | 7/2017 | Singh | H04L 45/026 |
| 2017/0279701 | A1* | 9/2017 | Ahmadzadeh | H04L 43/12 |
| 2017/0302539 | A1* | 10/2017 | Park | H04L 41/5016 |
| 2017/0353363 | A1* | 12/2017 | Parker | H04L 41/5035 |
| 2018/0077032 | A1* | 3/2018 | Park | H04L 41/5067 |

FOREIGN PATENT DOCUMENTS

| | | | |
|---|---|---|---|
| GB | 2542828 B | * 11/2017 | |
| WO | WO-2010003363 A1 | * 1/2010 | H04L 41/00 |

OTHER PUBLICATIONS

Chiba, et al., "Cisco Service-Level Assurance Protocol", rfc6812.txt, CISCO Service-Level Assurance Protocol; RFC6812.TXT, Internet Engineering Task Force, IETF; Standard, Internet Society (ISOC) 4, Rue des Falaises CH—1205 Geneva, Switzerland, Jan. 17, 2013 (Jan. 17, 2013), pp. 1-27,XP015086538, 27 pages.

Ramenzoni, "European Search Report for European Patent Application No. 17183699", dated Jan. 9, 2018, 11 pages.

Ramenzoni, "Examination Report issued in EP17183699 dated Jan. 24, 2019", 7 pages.

* cited by examiner

300

```
┌─────────────────────────────────────────────────────────────┐
│                         210 - 270                            │
└─────────────────────────────────────────────────────────────┘
                              │
                              ▼
┌─────────────────────────────────────────────────────────────┐
│  Receive, by the probe from the second node, the transmitted acknowledgment │
│                           310                                │
└─────────────────────────────────────────────────────────────┘
                              │
                              ▼
┌─────────────────────────────────────────────────────────────┐
│ Communicate, by the probe to the second node in response to the probe receiving the │
│           transmitted acknowledgment, the probe data stream  │
│                           320                                │
└─────────────────────────────────────────────────────────────┘
                              │
                              ▼
┌─────────────────────────────────────────────────────────────┐
│        Process, by the second node, the communicated probe data stream │
│                           330                                │
└─────────────────────────────────────────────────────────────┘
                              │
                              ▼
┌─────────────────────────────────────────────────────────────┐
│       Communicate, by the second node to the probe, the processed data stream │
│                           340                                │
└─────────────────────────────────────────────────────────────┘
                              │
                              ▼
┌─────────────────────────────────────────────────────────────┐
│  Terminate, by the second node, the executed command in accordance with the │
│                          OAM PDU                             │
│                           350                                │
└─────────────────────────────────────────────────────────────┘
```

FIG. 3

CONTROL OF NETWORK NODES IN COMPUTER NETWORK SYSTEMS

TECHNICAL FIELD

The disclosed technology relates to computer network control. More specifically, embodiments of the disclosed technology employ a computer network operations, maintenance, and administration (OAM) protocol to allow distributed elements of computer network systems to configure other nodes to respond to network probes.

BACKGROUND

A computer network is a telecommunications network that allows computers to exchange data. Network devices that originate, route, and terminate the data are called network nodes. Network nodes can include hosts, such as personal computers, phones, and servers, as well as networking hardware. In computer networks, network nodes pass data to each other along data connections. Data is typically transferred in the form of packets. Connections between network nodes are established using various media, such as fiber optic cable, coaxial cable, and wireless links.

Computer network analytics can be used to monitor the performance of a network (for example, quality of service, network congestion, and network resilience), to monitor and enforce network security, to provide visualizations of network operation, and to support network configuration activities. Analytics applications that operate on data obtained from a network typically require the network to be configured to generate the necessary input data, in addition to aggregating that data and performing queries over that data. One aspect that typical computer network analytics applications have in common is that users need to decide beforehand which information to generate and which aggregation queries to perform. Typically, a user needs to initiate a separate query or analytics task and configure data sources to generate the data that is needed.

BRIEF DESCRIPTION OF THE DRAWINGS

FIG. 3 is a block flow diagram depicting methods to control network nodes in computer network systems, in accordance with certain alternative example embodiments.

DESCRIPTION OF EXAMPLE EMBODIMENTS

Overview

Figure 1:
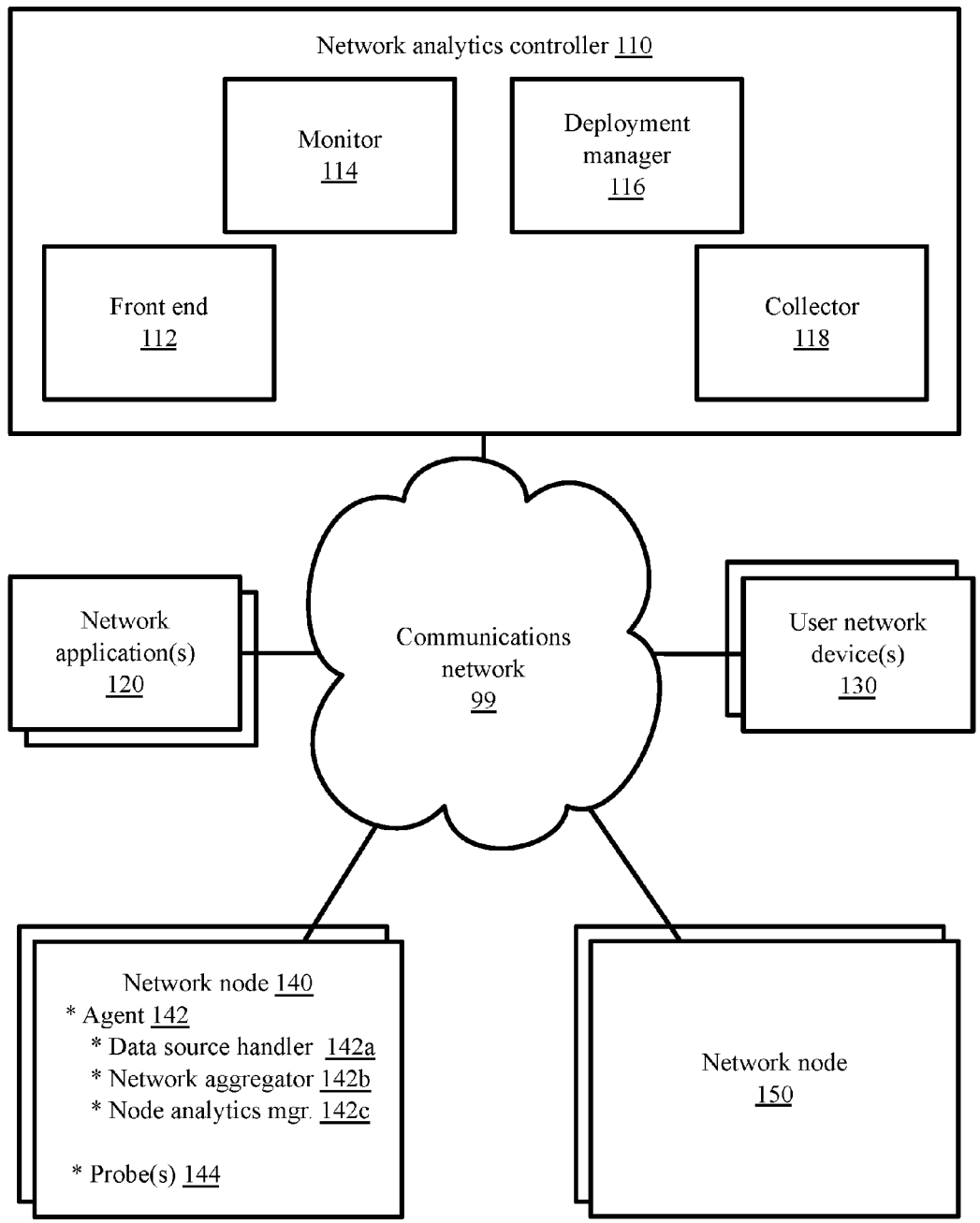
FIG. 1 is a block diagram depicting a computer network to control network nodes in computer network systems in accordance with certain example embodiments of the disclosed technology.

Considering both the current and predicted proliferation of sophisticated computer networks, manual or centralized configuration of network nodes to participate in network analytics can be resource-intensive, compromise security (e.g., ports left open), and, in some instances, degrade network performance in both the control plane and the data plane. In particular, active measurement to support network analytics typically involves a measurement probe. In telecommunications generally, a probe is an action taken or an object used for learning something about the state of the network. For example, an empty message can be sent simply to see whether the destination actually exists. Ping is a common utility for sending such a probe. The probe generates synthetic test traffic, which is sent from the probe at an originator node to a responder node. The responder time stamps the received test traffic and reflects it back to the probe at the originator. The probe can then determine various service level measures of the link between the originator and the responder, for example, packet delay, jitter, and packet loss.

Setting up an active measurement typically involves two separate configuration steps. In one step, the probe itself is configured, including determining the traffic to be used, how many packets at what intervals to send, where to send the test traffic packets, scheduling information, etc. In a second step, the responder is configured to properly respond to the probe test traffic, for example, opening up a port on the responder node. Configuring the responder allows the responder to know what to do with the traffic, for example, time stamping and reflecting an echo command. Typically, responder configuration is a resource intensive process. Responder ports should not be left open for security reasons, for example, to avoid attack vectors in which responder resources are exhausted by bogus test traffic (lower-end devices are often configured as responders). As a result, to configure an active measurement, an operator or management application establishes contact with not just the node hosting the probe but also the node hosting the responder. Such contact introduces additional operational complexity and can be error-prone.

Embodiments of the technology disclosed herein extend an OAM protocol, for example, the protocol in International Engineering Task Force (IETF) Request for Comment 7276, Institute for Electrical and Electronics Engineers (IEEE) Standard 803.3ah, International Telecommunication Union-T (ITU-T) Y.1731, and ITU G.8031, to control associations between active measurement probes and responders. For this purpose, at least one new OAM field type is introduced. One new OAM field type allows a probe to signal a measurement request to a responder. Parameters of the request can characterize aspects of the measurement, such as the responder port, the duration of the measurement, and the type and volume of measurement traffic that the probe will send. A responder can use an OAM response to acknowledge opening of the measurement port and to signal closing of the measurement port. Additional extensions to the OAM protocol include messages to extend the duration of a measurement and to terminate a measurement association when it is no longer needed. In some embodiments, the OAM message is the payload of a User Datagram Protocol (UDP) message carried in accordance with the Bidirectional Forwarding Detection (BFD) protocol. In some embodiments, the OAM field is the payload of an Echo command in the Internet Control Message Protocol (ICMP).

In particular, in some embodiments, one or more computing devices of a network, for example, a computer network analysis system, establishes an agent of the network analysis system on a node of the computer network. The established agent receives, via the network, a network analysis task. The network analysis task involves a second node of the network. The receiving network generates, in response to the task, a probe implementing the task and targeted to the second node. The probe includes a probe data stream. The receiving agent, or the generated probe, generates a command for the second node. The command is related to the probe and may be, for example, in the form of a data link layer protocol data unit (PDU) for network operations, administration, and maintenance (OAM). One of the agent and the probe communicates the command to the second node. The second node executes the communicated command and then transmits an acknowledgment of the executed command to the probe.

By using and relying on the methods and systems described herein, a computer network operator can use distributed network agents and probes to configure network nodes (both nodes hosting an agent, and nodes not hosting an agent) to receive and respond to network analysis traffic. As such, the systems and methods described herein may be employed to reduce the amount of manual and centralized resources necessary to adaptively perform network analysis, including analysis to support network performance at agreed-to service levels. The technology described herein can be used to improve network performance in both the control plane and the data plane by tailoring network node test configurations to directly respond to network analytics tasks, including to adaptive network analytics tasks requested by a distributed network analytics system. Hence, users of such technology can perform network analytics using fewer resources, in a more secure fashion, and with less impact on performance in both the control plane and the data plane of a computer network.

Turning now to the drawings, in which like numerals represent like (but not necessarily identical) elements throughout the figures, example embodiments are described in detail.

Example Architectures

In example architectures for the technology, while certain servers, systems, and devices shown in the architecture are represented by one instance of the server, system, or device, multiple instances of each can be used. Further, while certain aspects of operation of the present technology are presented in examples related to the figures to facilitate enablement of the claimed invention, additional features of the present technology, also facilitating enablement of the claimed invention, are disclosed elsewhere herein.

As depicted in FIG. 1, an architecture 100 for distributed and adaptive computer network analytics includes network computing devices, such as a network analytics controller 110, network applications 120, user network device(s) 130, and other network nodes 140 and 150; each of which may be configured to communicate with one another via communications network 99. In some embodiments, a user associated with a device must install an application and/or make a feature selection to obtain the benefits of the technology described herein. In some embodiments, a network node 140, 150 can be: a) a host, such as, but not limited to, a personal computer, phone, or server; or b) networking hardware, such as, but not limited to, a gateway, a router, a network bridge, a switch, a hub, or a repeater.

Communications network 99 includes one or more wired or wireless telecommunications means by which the network computing devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device can include a communication module capable of transmitting and receiving data over the communications network 99. For example, each network device can comprise a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

The network connections illustrated are example and other means of establishing communications between the computers and devices can be used. Additionally, those having ordinary skill in the art and having the benefit of the present disclosure will appreciate that the network devices illustrated in FIG. 1 may have any of several other suitable computer system configurations. For example, a user network device 130 embodied as a mobile phone or handheld computer may not include all the components described above.

Figure 4:
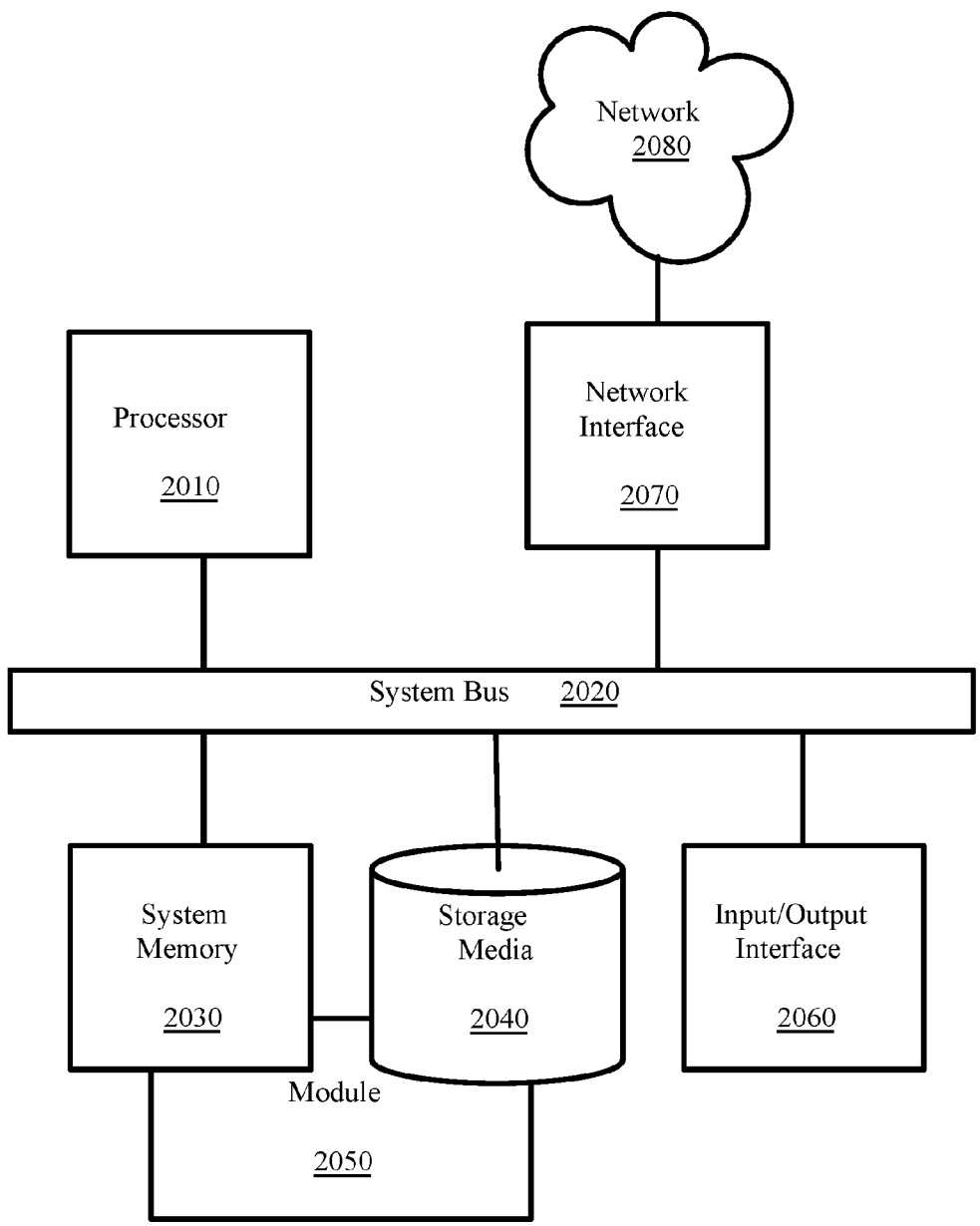
FIG. 4 is a block diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 4. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 4. The computing machines discussed herein may communicate with one another, as well as with other computing machines or communication systems over one or more networks, such as network 150. Each network may include various types of data or communications network, including any of the network technology discussed with respect to FIG. 4.

The example embodiments illustrated in the following figures are described hereinafter with respect to the components of the example operating environment and example architecture described elsewhere herein. The example embodiments may also be practiced with other systems and in other environments.

In the example architecture of FIG. 1, a network analytics controller 110 can control a network analytics service. The network analytics controller 110 can include the components or modules described hereinafter. A front end 112 exposes an interface that allows users (for example, via user network devices 130) and higher protocol layer network applications 120 to configure basic parameters (for example, data source, schedule, analytics functions, or tasks to be performed) for distributed analytics processing.

A network analytics monitor 114 provides a monitoring function that logs which network nodes, for example, node 140, participate in a given analytics function, a health status of analytics tasks, and statistics about each task, among other items. Users can retrieve such information, or be notified as appropriate, to get a sense of the level of degradation of a task (for example, in case of nodes in the network with degraded capabilities, an inability to support the requested query, etc.).

A network analytics deployment manager 116 determines network analytics tasks to be performed by one or more node analytics agents 142 deployed at network nodes 140, generates one or more agent-level tasks (also referred to as "maplets"), deploys those agent-level tasks to agents 142 across the network, determines where to deploy the network analytics tasks, and determines how to deal with the impact of network changes (for example, when a new node joins the network, deploying a task that is already ongoing in the network for other network nodes 140).

A network analytics results collector 118 collects the results from tasks performed at network nodes 140, 150. The collector 118 can collate those results for network analytics across network nodes 140, 150 or network level cross-correlation. For this purpose, results can be fed as a data stream into an instance of a stream processing engine that also runs at a network analytics controller 110. The processing to be conducted can be specified as part of a "reducelet" that defines the fields of the data stream and the query and aggregations to be applied. In some embodiments, the network analytics controller 110 can be implemented on top of a Software Defined Network (SDN) that allows network administrators to manage network services through abstraction of lower-level functionality by decoupling the control plane from the data plane. For example, a model constructed in a network configuration modeling language, such as a YANG Data Model, can be defined to describe network analytics tasks that can be configured by users. A network analytics task can include a network scope (indicating across which part of the network a task is to be applied), an agent-level task (indicating the data sources for the task, and the query and aggregation to be applied against the data), and a schedule. Using a YANG data model, a REpresentational State Transfer (REST) API can be generated and exposed by the network analytics controller 110 to users. A REST API, for example, as implemented using RESTCONF, provides a programmatic interface over HyperText Transfer Protocol (HTTP) for accessing data defined in the YANG data model.

A node analytics agent 142 can be deployed at some network nodes 140. Each agent 142 can include a data source handler 142a, a network aggregator 142b, and a node analytics manager 142c. The data source handler 142a can configure telemetry data sources, such as probes 144, as needed to collect the data that will be aggregated, and thus can configure the appropriate telemetry data queries, such as Simple Network Management Protocol (SNMP), or IP Service Level Agreements (IPSLA), for service level monitoring. The network aggregator 142b can execute both query and aggregation function logic that preprocesses raw data and forwards the aggregated data to the network analytics controller 110. One example includes continuous queries, such as used in a Continuous Query Engine (CQE). The node analytics manager 142c can communicate with the network analytics controller 110 for discovery, registration, and deployment of aggregation analytics tasks, and for conducting analytics admission functions (deciding whether to accept or decline task requests based on current load conditions) and systems management functions.

The architecture supports network data analytics that allow for adaptive refinement of data generation and analytics queries as specified in one or more agent-level tasks. Such embodiments allow parameters of the query to be automatically adjusted and sub-queries to be performed when a trigger condition is detected. The automatic adjustment can include the reconfiguration of required probes and spawning of network analytic tasks for the new data sources as needed. Further details regarding the architecture of FIG. 1 and the operation of a distributed network analytics system employing a controller 110, along with agents 142 and probes 144 deployed at network nodes 140, can be found in: co-pending U.S. patent application Ser. No. 14/589,953, entitled "Distributed and Adaptive Computer Network Analytics," filed on Jan. 5, 2015; and co-pending U.S. patent application Ser. No. 14/550,885, entitled "Network Embedded Framework for Distributed Network Analytics," filed on Nov. 21, 2014—each of which is hereby incorporated herein by reference in its entirety.

By using and relying on the methods and systems described herein, a computer network operator can use distributed network analytics agents 142 and probes 144 to configure network nodes (both nodes 140 hosting an agent 142, and nodes 150 not hosting an agent) to receive and respond to network analysis traffic. As such, the systems and methods described herein may be employed to reduce the amount of manual and centralized resources necessary to adaptively perform network analysis, including analysis to support network performance at agreed-to service levels. The technology described herein can be used to improve network performance in both the control plane and the data plane by tailoring network node 140, 150 test configurations to directly respond to network analytics tasks, including to adaptive network analytics tasks requested by a distributed network analytics system. Hence, users of such technology can perform network analytics using fewer resources, in a more secure fashion, and with less impact on performance in both the control plane and the data plane of a computer network.

Example Processes

Figure 2:
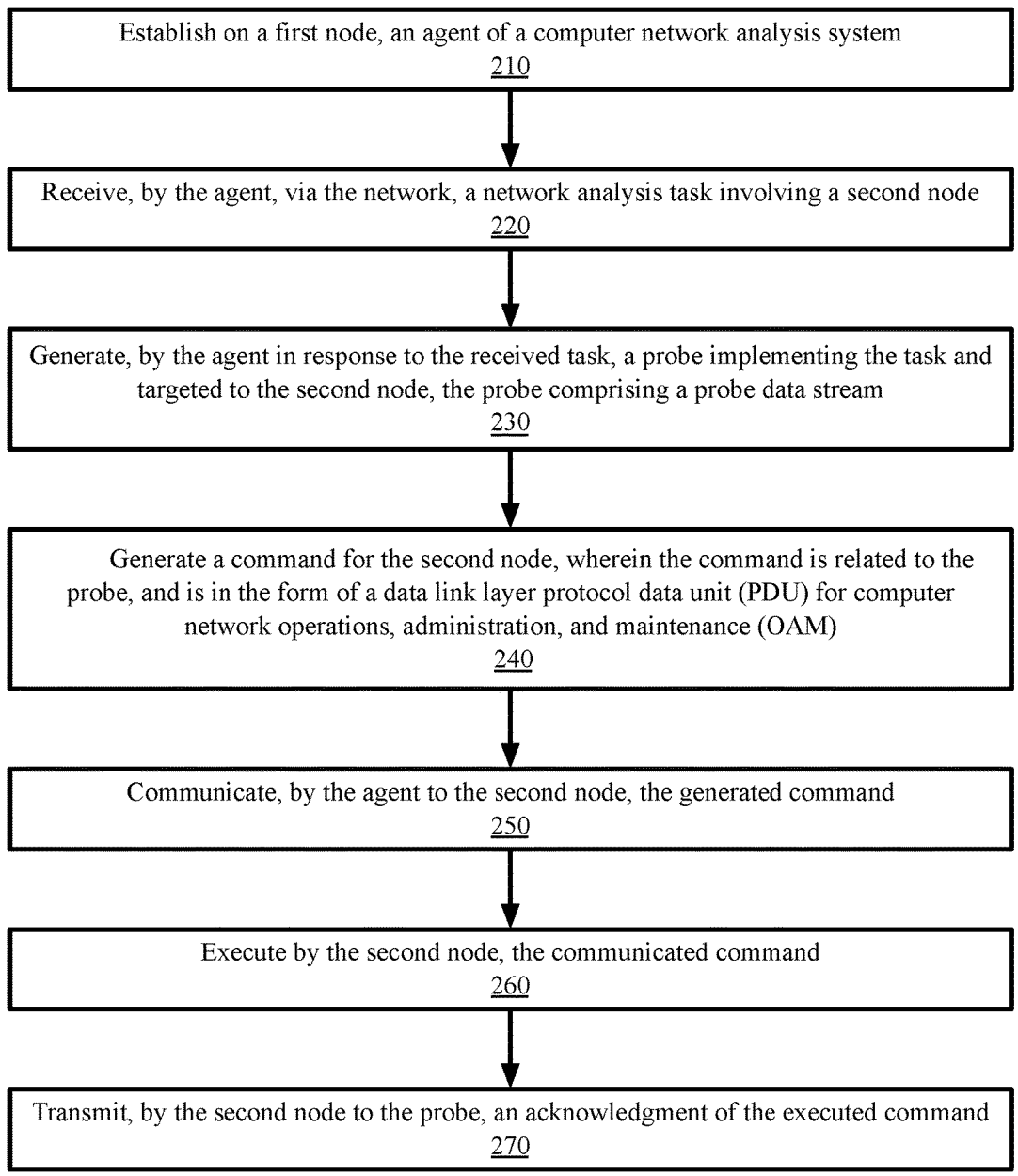
FIG. 2 is a block flow diagram depicting methods to control network nodes in computer network systems, in accordance with certain example embodiments.

Referring to FIG. 2, and continuing to refer to FIG. 1 for context, a block flow diagram illustrating methods 200 for computer network analytics in accordance with certain example embodiments is shown. In such embodiments, one or more computing devices, such as network analytics controller 110, establishes an agent 142 of a computer network analysis system on a first node 140 of a computer network—Block 210.

As a continuing example, a network operator desires to monitor link utilization across a plurality of network nodes, including node 140 and node 150. The system-level task is received by a network analytics controller 110 front end 112 from a user via a graphical user interface operating in a web browser on user network device 130. As part of the system-level task, the deployment manager 116 deploys agent 142 at network node 140 by installing agent software on the node 140 over network 99. In other embodiments, network node 140 is a device such as a router, and agent 142 was installed on the router 140 by the original equipment manufacturer of the router.

The established agent 142 receives, from the one or more computing devices via the network, a network analysis task, the network analysis task involving a second node of the network—Block 220. In the continuing example, as part of the system-level task, the deployment manager 116 determines network analytics tasks to be performed by an analytics agent 142 deployed at network node 140, and deploys an agent-level task specifying those tasks to agent 142 across the network 99. One of the tasks specified in the agent-level task deployed to agent 142 at node 140 involves monitoring the round trip time for communication between network node 140 and network node 150. While in the continuing example, network node 150 does not host an agent, the principles illustrated by the continuing example apply regardless of whether node 150 hosts an agent.

In response to the received agent-level task, the receiving agent 142 generates a probe 144 implementing the received agent-level task and targeted to the second node, the probe 144 including a probe data stream—Block 230. In the continuing example, the agent generates a probe that includes a series of IP Service Level Agreement (IPSLA) User Datagram Protocol (UDP) Echo packets as a probe data stream. IPSLA is an active computer network measurement technology. Network devices, such as routers and switches, enabled with IPSLA perform network tests and measurements using protocols such as UDP Echo to measure delay, jitter, and loss. In other embodiments, other active measurement approaches, such as Two-Way Active Measurement Protocol (TWAMP), and other messages, such as ICMP Echo, can be used in the probe 144. Each UDP echo packet is uniquely identifiable, and will be time stamped by the node 140 hosting the agent 142 upon transmission from that node 140. A flood of such requests to an open port on a node, such as node 150, may be used in denial-of-service (DoS) attacks, in which the attacker attempts to overwhelm the targeted node with echo requests. One of the benefits of the present technology is that is can be used to close ports on nodes that could be the target of a flood of echo requests.

In response to the received task, one of the receiving agent and the generated probe generates a command for the second node, wherein the command is related to the probe, and is in the form of a data link layer protocol data unit (PDU) for computer network operations, administration, and maintenance (OAM)—Block 240. In the continuing example, the OAM command is an "SLA Responder Activation" type command, where "Responder" refers to the second node that is to be configured to respond to the IPLSA probe discussed in connection with Block 230. The SLA Responder Activation command type and other OAM commands described herein are an extension to known OAM command types. The format of an SLA Responder Activation command used in the continuing example is show in TABLE 1.

TABLE 1

```
+----------------------------------+
|Type = SLA Responder Activation|
|Length = Field length|
|Value = set of sub-TLVs as follows|
|     1. Protocol (e.g., UDP) | Port|
|     2. Duration (secs, msecs)|
|     3. Data Type|
|     4. Volume|
|     ...
+----------------------------------+
```

The SLA Responder Activation OAM PDU is formatted in type-length-value (TLV) format at two hierarchical levels. At the first hierarchical level, the OAM PDU is formatted as <type><length><value>. At the first hierarchical level, the command <type> is specified. While OAM field is described herein in prose, implementation of each field in the PDU can be through codes, for example, type="5" corresponding to "SLA Responder Activation." The <length> field at the first hierarchical level specifies the overall length, for example, in bytes, of the OAM PDU. The <value> field at the first hierarchical level includes one or more TLV tuples. In particular, each sub-field in the <value> field of an OAM SLA Responder Activation field is itself a TLV tuple.

In the continuing example, the second hierarchical level under the <value> field includes sub-TLVs for at least the <protocol> and <duration> of a port to be opened on the responder to receive the IPSLA command(s). The <protocol> sub-field is formatted as <field type=protocol><field length=length of "protocol" sub-field><value=UDP>. Note that the value of the <protocol> sub-field corresponds to the protocol of the probe data stream—in the case of the continuing example, an IPSLA UDP Echo command, not to the OAM protocol. For certain manufacturers the <protocol> can be mapped to a port, for example UDP messages map to port 1167. Where a responder node 150 port may not be implicit, or where the network operator decides to use a different port, a port may be assigned to correspond to one on which the responder expects IPSLA traffic.

A typical <duration> for opening a port to receive a probe data stream for an IPSLA command is determined from the IPSLA operation frequency (seconds) and the number of IPLSA commands to be sent from the first node 140. For example, five cycles of one IPSLA command expected every 0.1 seconds results in a minimum port open time at the responder node 150 of 0.5 seconds. In some embodiments, a buffer is applied, for example, twice the frequency—in this case 0.2 additional seconds for a total of 0.7 seconds for the <duration> subfield. Since the <duration> sub-field is TLV tuple, the format is <type—duration><length=length of the duration sub-field><value=(sec)>.

A typical <data type> sub-field, though not required, can correspond to the data type of the IPLSA command. For example, <data type=hex value>. In a similar fashion, the <volume> sub-field can correspond to the IPLSA <data size> parameter. This pattern can continue for each characteristic of the IPSLA data stream to be sent from the first node 140 to the second node 150. As noted elsewhere, the specifics of this example regarding the IPSLA command are provided as context only.

In some embodiments, the OAM PDU is a TLV tuple of a type corresponding to extending the duration that a previously opened second node 150 port remains open, including a value indicating a duration for extending the period that the previously open second node 150 port is to remain open.

In some embodiments, the OAM PDU is a TLV tuple of a type corresponding to closing a previously opened second node port 150, including a value indicating the previously opened second node 150 port.

The generating entity (the agent 142 or the probe 144) communicates the generated command to the second node 150—Block 250. In the continuing example, agent 142 communicates the OAM PDU to node 150 as a payload of a transport layer packet, specifically a bi-directional forwarding detection (BFD) packet. In the continuing example, the OAM PDU is carried using seamless BFD. Seamless BFD is described in IETF RFC 7880 as a simplified mechanism for using BFD with a large proportion of negotiation aspects eliminated, thus providing benefits such as quick provisioning, as well as improved control and flexibility for network nodes initiating path monitoring. The OAM PDU is carried as the payload of a BFD PDU using the authentication features of seamless-BFD. In other embodiments, the OAM PDU can be included in an ICMP Echo, or in mechanisms like those defined in for UDP trace route (as described in IETF draft-shen-udp-traceroute-ext-01 and IEFT draft-shen-traceroute-ping-ext-04). In each case, the receiving node 150 reads the OAM PDU contained in the BFD packet.

The receiving node 150 executes the communicated OAM command—Block 260. In the continuing example, node 150 executes the OAM "SLA Responder Activation" command by first parsing each of the TLV and sub TLV fields of the command an opening port 1167 of node 150 for seven seconds to receive, time stamp, and reflect back to node 140 a stream of IPSLA UDP Echo packets.

The receiving node 150 also transmits an acknowledgment of the executed command to the initiating node 140—Block 270. The acknowledgment reduces, if not essentially eliminates, the risk that the initiating node 140 will begin transmitting packets to an unopened port (hence increasing network traffic for no productive reason, and possible leading to a false negative conclusion regarding the health of the link between node 140 and node 150). In this step, the OAM PDU is a TLV tuple of a type corresponding to acknowledging that a responder has been activated per an "SLA Responder Activation" command.

Referring to FIG. 3, and continuing to refer to prior figures for context, methods 300 to control network nodes in computer network analytics systems are shown, in accordance with certain alternative example embodiments. In such methods, Blocks 210-270 are performed as described above. In such methods, the probe received the transmitted acknowledgment from the second node—Block 310. In the continuing example, the probe 144 generated at node 140 received an OAM PDU encapsulated in a BFD packet indicating that port 1167 of node 150 has been opened for 0.7 seconds to receive, time stamp, and reflect back to node 140 a stream of IPSLA packets.

In response to the probe 144 receiving the transmitted acknowledgment, the probe 144 communicates the probe data stream to the second node 150—Block 320. In the continuing embodiment, the probe, after receiving the acknowledgment OAM PDU, initiates the stream of IPSLA UDP Echo packets to the reflector second node 150. The ICMP Echo operation measures end-to-end response time between the initiator node 140 and the reflector node 150. Node 150 receives the IPSLA data packets on port 1167.

The second node 150 processes the communicated probe data stream—Block 330. In the continuing example, the reflector node 150 time stamps each received IPSLA Echo packet. In other embodiments, more sophisticated IPSLA processing can occur. The second node 150 communicates the processed data stream to the first node 150—Block 340. In the continuing example, the reflector node 150 communicates the timed stamped IPSLA UDP Echo response to the initiator node 140. As noted above, the specific IPSLA processing is outside the scope of this application.

The second node 150 terminates the executed command in accordance with the OAM PDU—Block 350. In the continuing example, upon expiration of the time specified in the OAM "SLA Responder Activation" command, the second node 150 closes port 1167. This ends the association between the initiator node 140 and the reflector node 150 based on the OAM command. In some embodiments, ending the association, the second node communicates a termination acknowledgment OAM message to the initiator node 140.

Other Example Embodiments

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended block flow diagrams and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
   installing, by one or more computing devices, on a first node of a plurality of nodes of a computer network, an agent of a computer network system;
   receiving, by the installed agent, from the one or more computing devices via the network, a network task, the network task involving a second node of the network;
   generating, by the receiving agent and in response to the received task, a probe implementing the received task and targeted to the second node;
   generating, by the receiving agent, a command to configure the second node to respond to the generated probe, wherein the command is in the form of a data link layer protocol data unit (PDU) for computer network operations, administration, and maintenance (OAM), and the OAM PDU comprises a type/length/value (TLV) tuple comprising:
      a type corresponding to opening a second node port,
      a length describing the length of the OAM PDU, and
      a value comprising a plurality of sub-TLVs indicating a data stream protocol of a probe data stream, the second node port targeted by the probe data stream, and a duration for opening the second node port;
   communicating, by the generating agent, the generated command to the second node;
   configuring, by the second node, the second node in accordance with the communicated command; and
   transmitting, by the second node to the communicating agent in response to configuring the second node in accordance with the communicated command, an acknowledgment that the second node has been configured in accordance with the communicated command.

2. The method of claim 1, further comprising:
   receiving, by the agent from the second node, the transmitted acknowledgment;
   communicating, by the agent to the second node in response to the agent receiving the transmitted acknowledgment, a probe data stream of the agent, the probe data stream comprising data to probe the network between the first node and the second node;
   processing, by the second node, the communicated probe data stream to respond to the agent;
   communicating, by the second node, the processed data stream to the agent; and
   terminating, by the second node, the configuration in accordance with the communicated command.

3. The method of claim 1, wherein communicating comprises communicating the generated command as a payload of a transport layer packet.

4. The method of claim 3, wherein the transport layer packet is a bi-directional forwarding detection (BFD) packet.

5. The method of claim 1, wherein:
   the generated command is in the form of a data link layer protocol data unit (PDU) for computer network operations, administration, and maintenance (OAM); and
   the OAM PDU comprises a type/length/value (TLV) tuple comprising a type corresponding to closing a previously opened second node port, a length describing the length of the PDU, and a value indicating the previously opened second node port.

6. The method of claim 1, wherein:
   the generated command is in the form of a data link layer protocol data unit (PDU) for computer network operations, administration, and maintenance (OAM); and
   the OAM PDU comprises a type/length/value (TLV) tuple comprising a type corresponding to extending the duration that a previously opened second node port remains open, a length describing the length of the PDU, and a value indicating duration for extending the period that the previously open second node port is to remain open.

7. A computer program product, comprising:
   a non-transitory computer-readable storage device having computer-executable program instructions embodied thereon that when executed by one or more computing devices cause the one or more computing devices to control network nodes in computer network analytics systems, the computer-executable program instructions comprising:
      computer-executable program instructions to install, on a first node of a plurality of nodes of a computer network, an agent of a computer network analysis system;
      computer-executable program instructions to receive, by the installed agent, via the network, a network analysis task, the network analysis task involving a second node of the network;
      computer-executable program instructions to generate, by the receiving agent and in response to the received task, a probe implementing the received task and targeted to the second node, the probe comprising a probe data stream;
      computer-executable program instructions to generate, by the receiving agent, a command to configure the second node to respond to the generated probe, wherein the command is in the form of a data link layer protocol data unit (PDU) for computer network operations, administration, and maintenance (OAM), wherein the command is in the form of a data link layer protocol data unit (PDU) for computer network operations, administration, and maintenance (OAM), and the OAM PDU comprises a type/length/value (TLV) tuple comprising:
         a type corresponding to opening a second node port,
         a length describing the length of the OAM PDU, and
         a value comprising a plurality of sub-TLVs indicating a data stream protocol of a probe data stream, the second node port targeted by the probe data stream, and a duration for opening the second node port;

computer-executable program instructions to communicate, by the generating agent, the generated command to the second node;

computer-executable program instructions to configure, by the second node, the second node in accordance with the communicated command; and computer-executable program instructions to transmit, by the second node to the communicating agent in response to configuring the second node in accordance with the communicated command, an acknowledgment that the second node has been configured in accordance with the communicated command.

8. The computer program product of claim 7, wherein the OAM PDU comprises a type/length/value (TLV) tuple comprising a type corresponding to extending the duration that a previously opened second node port remains open, a length describing the length of the PDU, and a value indicating duration for extending the period that the previously open second node port is to remain open.

9. The computer program product of claim 7, further comprising:

computer-executable program instructions to receive, by the agent from the second node, the transmitted acknowledgment;

computer-executable program instructions to communicate, by the agent to the second node in response to the agent receiving the transmitted acknowledgment, a probe data stream of the agent, the probe data stream comprising data to probe the network between the first node and the second node;

computer-executable program instructions to process, by the second node, the communicated probe data stream to respond to the agent;

computer-executable program instructions to communicate, by the second node, the processed data stream to the agent; and computer-executable program instructions to terminate, by the second node, the executed command in accordance with the OAM PDU.

10. The computer program product of claim 7, wherein communicating comprises communicating the OAM PDU as a payload of a transport layer packet.

11. The computer program product of claim 10, wherein transport layer packet is a bi-directional forwarding detection (BFD) packet.

12. The computer program product of claim 7, wherein the OAM PDU comprises a type/length/value (TLV) tuple comprising a type corresponding to closing a previously opened second node port, a length describing the length of the PDU, and a value indicating the previously opened second node port.

13. A system, comprising:

one or more network devices of a computer network, the one or more network devices comprising memory and one or more processors communicatively coupled to the memory, wherein the one or more processors execute instructions that are stored in the memory to cause the one or more network devices to:

install on a first node of a plurality of nodes of the computer network, an agent of a computer network analysis system;

receive, by the installed agent, via the network, a network analysis task, the network analysis task involving a second node of the network;

generate, by the receiving agent and in response to the received task, a probe implementing the received task and targeted to the second node, the probe comprising a probe data stream;

generate, by the receiving agent, a command to configure the second node to respond to the generated probe, wherein the command is in the form of a data link layer protocol data unit (PDU) for computer network operations, administration, and maintenance (OAM), wherein the command is in the form of a data link layer protocol data unit (PDU) for computer network operations, administration, and maintenance (OAM), and the OAM PDU comprises a type/length/value (TLV) tuple comprising:

a type corresponding to opening a second node port, a length describing the length of the OAM PDU, and a value comprising a plurality of sub-TLVs indicating a data stream protocol of a probe data stream, the second node port targeted by the probe data stream, and a duration for opening the second node port;

communicate, by the generating agent, the generated command to the second node;

configure, by the second node, the second node in accordance with the communicated command; and transmit, by the second node to the communicating agent in response to configuring the second node in accordance with the communicated command, an acknowledgment that the second node has been configured in accordance with the communicated command.

14. The system of claim 13, wherein the OAM PDU comprises a type/length/value (TLV) tuple comprising a type corresponding to extending the duration that a previously opened second node port remains open, a length describing the length of the PDU, and a value indicating duration for extending the period that the previously open second node port is to remain open.

15. The system of claim 13, wherein the OAM PDU comprises a type/length/value (TLV) tuple comprising a type corresponding to closing a previously opened second node port, a length describing the length of the PDU, and a value indicating the previously opened second node port.

16. The system of claim 13, wherein the processors execute instructions that are stored in the memory to cause the one or more network devices to:

receive, by the agent from the second node, the transmitted acknowledgment;

communicate, by the agent to the second node in response to the agent receiving the transmitted acknowledgment, a probe data stream of the agent, the probe data stream comprising data to probe the network between the first node and the second node;

process, by the second node, the communicated probe data stream to respond to the agent;

communicate, by the second node, the processed data stream to the agent; and terminate, by the second node, the configuration in accordance with the OAM PDU.

17. The system of claim 13, wherein communicating comprises communicating the OAM PDU as a payload of a transport layer packet.

* * * * *